April 10, 1956  R. C. HESS ET AL  2,740,991
MARBLING PLASTIC SHEET
Filed May 3, 1952

INVENTORS
RAYMOND C. HESS
LOUIS L. CARPENTER
WALDEMAR HORSTEMEIER
BY
ATTORNEY

United States Patent Office 2,740,991
Patented Apr. 10, 1956

2,740,991

MARBLING PLASTIC SHEET

Raymond C. Hess, Westfield, and Louis L. Carpenter and Waldemar Horstemeier, Plainfield, N. J., assignors to Union Carbide and Carbon Corporation, a corporation of New York Application May 3, 1952, Serial No. 285,924

6 Claims. (Cl. 18—48.8)

This invention relates to marbling plastic sheet, and more particularly to a calender process for embodying color material into the base sheeting to produce a mottled effect simulating the characteristic appearance of variegated marble.

While the invention is of general application to plastic sheeting of all kinds, it is particularly directed to hard surface floor coverings, and especially to continuous roll material with a felt backing and simulating inlaid linoleum. For this purpose, the vinyl resins have advantages of excellent abrasion and chemical resistance, the ability to produce better whites and pastel shades, and the low inventory of raw materials in process.

In an endeavor to produce a variegated color effect, when chips of color material are fed to base material and then calendered, the color material is elongated, streaked or smeared, and produces a unidirectional pattern somewhat similar to the grain of wood, and known as a jaspe pattern, as distinguished from the desired mottled multidirectional or non-directional pattern characteristic of variegated marble. This effect is largely due to the customary rolling bank at the second bite of the calender rolls. A rolling bank will break up the color to some extent, but in the calender direction only. Thus a rolling bank results in long streaks of color extending in the calender direction.

The linoleum industry has coped with this problem and produced a marbled effect by calendering a sheet, cutting the sheet into sections, turning the sections through a right angle, and calendering a second time in a direction transverse to the first calendering. This process is costly and laborious, and it is therefore the main object of the present invention to provide a continuous single calender process to produce a marbled plastic sheet having a sharp, well defined mottle or variegation.

According to the present invention, marbled plastic sheet is produced by feeding base plastic and pieces of color plastic to the first bite of a calendering operation, and passing the plastics from said first bite to a folding mottling bank at a second bite in the calendering operation. Preferably the base plastic is in the form of hot granules, and the color plastic is in the form of slivers. A baffle plate is mounted between the top roll and the offset roll of the calender. The base compound granules are fed between the baffle and the top roll, and the color slivers are fed simultaneously between the other side of the baffle and the offset roll, the slivers being fed in aligned relation disposed transversely to the direction of calendering.

In the first bite, the base granules are commingled with each other and compressed and cohered to form a sheet of plastic, and the color slivers are simultaneously embedded in the face side of said base sheet and compressed to disrupt their edges to intermingle with the base plastic thereunder and therebetween.

The purpose of the baffle is two-fold: (a) it maintains a constant feed and uniform flow of base compound granules to the first calender bite, and (b) it places the colored mottling compounds on the offset roll side, or eventual wearing surface side of the calendered sheet. It has been found that a more sharply defined mottle can be produced when the color is added to the top rather than to the back of the sheet.

The mottling bank at the second bite is the most important single factor in obtaining a good marbled sheet. This bank is of a folding rather than a rolling type. The type of bank obtained at this point is dependent upon the temperature, the temperature differential between the top and middle rolls, the feed to the first bite, and the compound formulation.

According to the preferred embodiment of the present invention, the base compound which forms the background of the pattern is fluxed in a Banbury mixer to a temperature of 140° C. This base compound is then given two passes on the two roll mill with surface temperatures of 120–125° C., then fed to a granulator while still hot. The hot granules at 110° C. are then fed to the first bite of a four roll L-type calender and calendered to a 0.027" sheet, using temperatures of 105° C. offset roll, 122° C. top roll, and 110° C. middle roll. The bottom roll is used as a take-off roll.

A hot granular stock proved to be the best form for feeding the base compound to the calender. Flow behavior allows the base stock to be placed into the bite in a position which allows the colored mottling stocks to be also fed uniformly into the bite, and granular stock provides a more uniform compound temperature than any other form of feed. A constant rate of feed to the first bite is essential to maintain a good mottling at the second bite.

Figure 1:
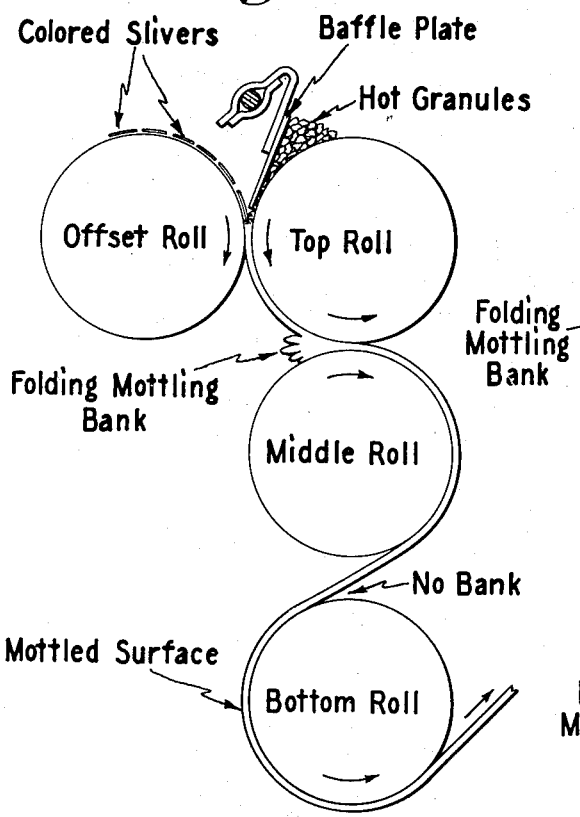
Fig. 1 is a diagram of a four-roll inverted L-type calender adapted for carrying out the process according to the present invention.
Figure 3:
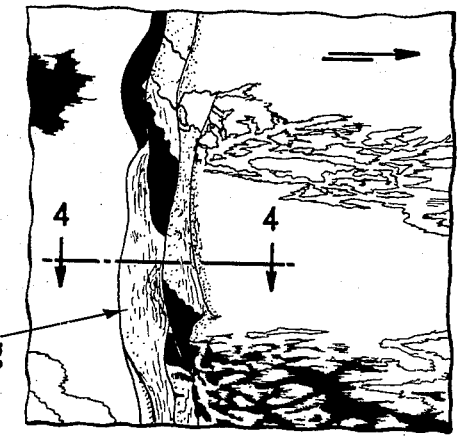
Fig. 3 is a front view of the sheet passing through the folding mottling bank at the second calender bite.

As shown in Fig. 1, the base compound granules are introduced between the top roll and the baffle plate at the first bite, and colored compounds in the form of slivers are fed between the offset roll and the baffle plate, so as to be simultaneously introduced into the same first bite between the top roll and the offset roll.

The colored compounds are fed cold, because heating thereof would result in the color being drawn out too far in the calender direction on passing through the first bite. The only working required in this first pass is that the colored stocks be embedded in the base compound and be drawn out as little as possible. Slivers of the mottling compounds one sixteenth to one quarter inch wide, one-half to three inches long, and twenty thousandths of an inch thick provided the best results and gave the most desirable marbleization.

The slivers are fed with their lengths transverse to the calender direction. This produces a two-directional color break-up. Care must be exercised to avoid feeding the longer slivers into the bite longitudinally, otherwise these slivers would be drawn out much too far in the calender direction. The size and shape of the pieces of color stock determine to a large extent the type of mottling obtained. The smaller pieces serve to fill in between the larger color mottles. By varying these there is a wide choice of patterns available. A very attractive overall marble pattern results in each instance.

The positioning of the baffle is also an important factor. The depth to which it is placed into the bite is the most important adjustment in its installation. The proper depth is that at which there is no flow of base compound granules to the area between the offset roll and the baffle. If such flow occurs, it interferes with the flow of the mottling compounds into the bite and results in poor color distribution in the sheet.

Figure 4:
Fig. 4 is a cross section through the folding mottling bank, taken along the line 4—4 of Fig. 3.
Figure 2:
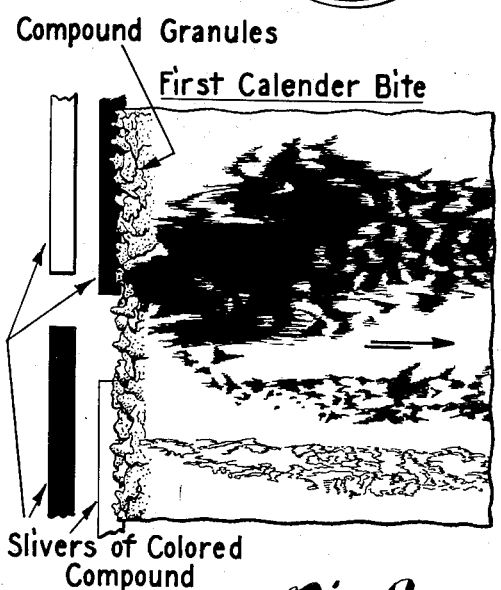
Fig. 2 is a front view of the sheet passing from the first calender bite.

The sheet of plastic with color compound embedded therein, as formed in the first bite between the top roll and the offset roll, passes along the top roll and approaches the middle roll, where it enters the folding mottling bank at the bite between the top roll and the middle roll, as shown in Fig. 4.

In this folding and mottling bank, the oncoming sheet encounters the excess of preceding material accumulated at the bite between the top roll and the middle roll. Being of relatively stiff consistency and having little adhesion to the middle roll, it leaves the middle roll intermittently to double over, and returns to the said second bite in multiple thicknesses of superimposed folds. These superimposed folds interrupt or prevent the longitudinal extension of the color, and increase the number of thicknesses entering the second bank and thereby increase the lateral spread of the color.

This mottling bank at the second calender bite must therefore be a folding rather than a rolling bank to obtain marbling. It is this folding action which makes possible the marble effect. The size of the mottling bank is one of the factors determining the type of color marbling obtained. It must be large enough to form breaking folds but must at the same time be maintained small enough to avoid fingering. The formation of cold fingers as a result of too large a bank may produce streaks in the calendered sheet. After the optimum size of bank is established, it must be maintained at approximately that size to insure satisfactory marbling and uniformity of pattern.

Figure 5:
Fig. 5 is a top view of the finished product.

Under the above conditions a very good marbleized sheet can be calendered at ten feet per minute on an 18 inch by 48 inch calender. Fig. 5 illustrates such a sheet.

Upon increasing the speed to 15 ft. per minute without changing roll temperatures the folding mottling bank becomes a rolling bank and poor marbling results. The rolling bank indicates a higher compound temperature which is the result of the increased calendering speed. Thus the problem of maintaining the desired folding mottling bank at calendering speeds above ten feet per minute is one of temperature control.

Uniformity of bank size across its entire width is likewise important. The offset roll must be properly contoured to give such a uniform bank, otherwise different types of color mottling will result across the width of the sheet.

It must be understood that the conditions outlined for producing a good marbled sheet were established for the particular equipment used. Some of these conditions will undoubtedly be modified in converting to larger production scale installation. Size of mottling bank for example, will depend largely on the size of calender rolls. Processing temperatures at the various stages will also most likely be modified. For example, granulation of the base compound might be most conveniently effected by a scratcher operation which would necessitate the use of higher Banbury temperatures and mill temperatures to insure good adhesion of the base compound sheet to the mill. In short, optimum processing conditions will have to be established for the particular operation.

We claim:

1. Method of producing plastic sheet having a marbled appearance which comprises continuously and simultaneously feeding a base of plastic material and pieces of colored plastic material to the first bite of a calendering operation, forming at said first bite a longitudinally continuous intermediate sheet of colored plastic material wherein the pieces of colored plastic material are embedded in the base material, passing said intermediate sheet continuously in its longitudinal direction at calendering speeds to a second bite in the calendering operations, and controlling the temperature at said second bite with respect to the calender speed to produce a folding mottling bank at said second bite wherein distribution of the colored pieces embedded in the base material occurs to produce a marbled effect.

2. Method of producing plastic sheet having a marbled appearance, which comprises continuously feeding hot granules of base plastic material to the first bite of a calendering operation, simultaneously continuously feeding cold slivers of colored plastic material to the same first bite in substantially aligned relation transverse to the direction of calendering and in spaced relation longitudinal thereto, forming at said first bite a longitudinally continuous intermediate sheet of colored plastic material wherein the slivers of colored plastic material are embedded in the base material, passing said intermediate sheet continuously in its longitudinal direction at calendering speeds to a second bite in the calendering operation, and controlling the temperature at said second bite with respect to the calender speed to produce a folding mottling bank at said second bite wherein the colored slivers embedded in the base material are distributed to produce a marbled effect.

3. Method of producing plastic sheet having a marbled appearance, which comprises continuously feeding granules of base plastic material to the top roll side of the first bite of a calendering operation, simultaneously continuously feeding pieces of colored plastic material to the offset roll side of the first bite, continuously forming at said first bite a longtudinally continuous intermediate sheet of colored plastic material wherein the pieces of colored plastic material are embedded in the base plastic and formed into an intermediate sheet, passing said intermediate sheet continuously in its longitudinal direction at calendering speed to a second bite in the calendering operation, and controlling the temperature at said second bite with respect to the calendering speed to produce a folding mottling bank at said second bite wherein the colored pieces embedded in the base material are distributed to produce a marbled effect.

4. Method of producing plastic sheet having a marbled appearance, which comprises continuously feeding a base of plastic material to the first bite of a calendering operation, simultaneously continuously feeding pieces of color plastic material to the same first bite whereby the colored plastic material is embedded in the base plastic material and formed into a longitudinally continuous intermediate sheet, passing said intermediate sheet from said first bite continuously at calendering speed in its longitudinal direction to a second bite parallel to said first bite of the calendering operation, and controlling the temperature at said second bite with respect to the calendering speed to form a bank wherein the oncoming sheet from the first bite encounters the bank, doubles over and returns to the second bite in multiple thicknesses of superimposed folds.

5. Method of producing plastic sheet having a marbled appearance, in a calender having a baffle between the top roll and the offset roll, which comprises continuously feeding hot granules of base plastic material between the top roll and the baffle, simultaneously continuously feeding cold slivers of colored plastic material between the offset roll and the baffle in substantially aligned relation transverse to the direction of calendering whereby the colored plastic material is embedded in the base plastic material and formed into a longitudinally continuous intermediate sheet, passing said intermediate sheet on the top roll continuously in its longitudinal direction at calendering speed to a parallel roll therebelow, and controlling the temperature on said top roll with respect to the calendering speed to form a bank wherein the oncoming sheet on the top roll encounters the bank at the bite between the top roll and the roll therebelow, doubles over and returns to said bite in multiple thicknesses of superimposed folds.

6. Method of producing plastic sheet having a marbled appearance, which comprises continuously feeding a base of plastic material to the first bite of a calendering operation, simultaneously continuously feeding pieces of colored plastic material to the same first bite of said calendering operation wherein an intermediate sheet of plastic material is formed and the colored plastic material is embedded therein and extended longitudinally of the direction of calendering, passing said intermediate sheet continuously in its longitudinal direction at calendering speed to a second bite in the calendering operation, and controlling the temperature at said second bite with respect to the calendering speed to produce a folding mottling bank at said second bite wherein the colored plastic material embedded in said intermediate sheet is extended laterally of the direction of calendering.

References Cited in the file of this patent

UNITED STATES PATENTS

| | | |
|---|---|---|
| 1,531,763 | Stedman | Mar. 31, 1925 |
| 1,612,724 | Housekeeper | Dec. 28, 1926 |
| 1,619,359 | Mell | Mar. 1, 1927 |
| 1,763,314 | McConoughey | June 10, 1930 |
| 2,444,094 | Duggan | June 29, 1948 |
| 2,608,717 | Kay | Sept. 2, 1952 |